(12) United States Patent
Yu et al.

(10) Patent No.: US 11,217,932 B2
(45) Date of Patent: Jan. 4, 2022

(54) ELECTROMAGNETIC COMPATIBILITY TYPE CABLE LOCKING JOINT

(71) Applicant: Jiaxing Sheng Yang Electric Co., Ltd., Zhejiang (CN)

(72) Inventors: Zhiming Yu, Hanchuan (CN); Xiaoyuan Xu, Wuxi (CN); Longjun Chen, Dingxi (CN)

(73) Assignee: Jiaxing Sheng Yang Electric Co., Ltd.

( * ) Notice: Subject to any disclaimer, the term of this patent is extended or adjusted under 35 U.S.C. 154(b) by 0 days.

(21) Appl. No.: 17/040,215

(22) PCT Filed: Jun. 5, 2019

(86) PCT No.: PCT/CN2019/090097
§ 371 (c)(1),
(2) Date: Sep. 22, 2020

(87) PCT Pub. No.: WO2019/242502
PCT Pub. Date: Dec. 26, 2019

(65) Prior Publication Data
US 2021/0126398 A1      Apr. 29, 2021

(30) Foreign Application Priority Data

Jun. 20, 2018   (CN) .......................... 201810634142.1

(51) Int. Cl.
| | |
|---|---|
| *H01R 13/502* | (2006.01) |
| *H01R 13/52* | (2006.01) |
| *H01R 13/639* | (2006.01) |
| *H01R 13/648* | (2006.01) |

(52) U.S. Cl.
CPC ..... *H01R 13/5205* (2013.01); *H01R 13/5202* (2013.01); *H01R 13/639* (2013.01); *H01R 13/648* (2013.01); *H01R 13/502* (2013.01)

(58) Field of Classification Search
CPC ............ H01R 13/5205; H01R 13/5202; H01R 13/639; H01R 13/648; H01R 13/502; H01R 24/20; H02G 15/025; H02G 15/013
See application file for complete search history.

(56) References Cited

U.S. PATENT DOCUMENTS

| | | | |
|---|---|---|---|
| 7,097,499 B1 * | 8/2006 | Purdy ................ | H01R 13/5205 439/578 |
| 2018/0366883 A1 * | 12/2018 | Mori .................. | H01R 13/5205 |

FOREIGN PATENT DOCUMENTS

WO    WO-2018176509 A1 *  10/2018    ......... H01R 13/5202

\* cited by examiner

*Primary Examiner* — Tho D Ta

(57) ABSTRACT

Disclosed in the present disclosure is an electromagnetic compatibility type cable locking joint. The electromagnetic compatibility type cable locking joint comprises a joint main body, a joint cap, a sealing ring, and a shielding member. The joint main body has a central hole, and an inner step is provided in the central hole. The sealing ring is connected to the end of the joint main body, and a positioning groove is formed between the sealing ring and the inner step. The joint cap is connected to the sealing ring, the shielding member comprises an upper ring, a lower ring, and an arc-shaped elastic piece. A plurality of arc-shaped elastic pieces are uniformly arranged in a circle. The upper end of each arc-shaped elastic piece is formed on the upper ring, and the lower end of each arc-shaped elastic piece is formed on the lower ring.

6 Claims, 1 Drawing Sheet

ELECTROMAGNETIC COMPATIBILITY TYPE CABLE LOCKING JOINT

TECHNICAL FIELD

This disclosure relates to an electromagnetic compatibility type cable locking joint.

BACKGROUND

Presently, electromagnetic compatibility type cable locking joints are widely used in various fields. The cable shielding layer is connected with the junction box through an electromagnetic compatibility type cable locking joint, which prevents the electronic equipment from affecting or being affected by other equipment. Its main function is to connect and fix the cables, as well as ensures the cables' high waterproof performance, flame-retardant performance, and electromagnetic compatibility, thus effectively providing long-term protection to the cables and the equipment.

In the prior art, conventional electromagnetic compatibility type cable locking joints mainly comprise a metal body, a metal joint cap, a nylon clamping jaw, and a shielding ring. When the electromagnetic compatibility type cable locking joint needs to be connected with a cable, the cable is inserted into the cable locking joint after its shielding layer is removed, and then the shielding ring is placed between the conducting thin-wires and the shielding layer which is cut open. Subsequently, by means of the metal body, the metal joint cap and the nylon clamping jaw, the cable is locked tightly, thus achieving high electromagnetic compatibility. However, the aforesaid structure has the following shortcomings:

1. It is difficult to make copper terminals connected with the cable quickly pass through the cable joint, failing to achieve a quick grounding.
2. The installation of cable shields is troublesome, resulting in poor shielding performance.
3. The installation is inconvenient, and the cutting-open of the shielding layer is time-consuming.
4. The high temperature generated by the nylon clamping jaw and the cable insulating layer leads to a hot-melting phenomenon.
5. The grounding area is small such that the shielding effect is poor, and the cables cannot be protected against the surge and high-voltage breakdown.

SUMMARY

The purpose of the present disclosure is to provide an electromagnetic compatibility type cable locking joint, which achieves a convenient connection with the cable and an ideal shielding effect.

To achieve the above purpose, the present disclosure adopts the following technical solution: an electromagnetic compatibility type cable locking joint comprising a joint main body, a joint cap, a sealing ring, and a shielding member, wherein the joint main body is provided with a tubular central hole, and an inner step is arranged in the central hole, wherein the sealing ring is connected to an end portion of the joint main body, and a positioning groove is formed between the sealing ring and the inner step, wherein the shielding member comprises an upper ring, a lower ring and a plurality of arc-shaped elastic pieces, wherein the arc-shaped elastic pieces are circumferentially uniformly arranged, wherein the upper end of each arc-shaped elastic piece is formed on the upper ring, and the lower end of each arc-shaped elastic piece is formed on the lower ring, wherein the middle portion of the arc-shaped elastic piece is bent towards the center of the upper ring or the lower ring, wherein the shielding member is arranged in the central hole, the upper ring is located in the positioning groove, and the lower ring is capable of moving along the axial direction of the central hole.

In another preferred embodiment, the upper end of the arc-shaped elastic piece is formed at the upper end of the upper ring, and the position where the arc-shaped elastic piece is formed is configured to be over-arc.

In another preferred embodiment, the lower end of the arc-shaped elastic piece is formed at the lower end of the lower ring, and the position where the lower ring is formed is configured to be over-arc.

In another preferred embodiment, a flange is arranged on the outer sidewall of the joint main body, and a mounting groove is formed at the position where the sidewall of the joint main body and the flange are connected. The mounting groove is internally provided with a sealing washer.

In another preferred embodiment, the outer surface of the sealing ring is configured to be step-shaped and is divided into an upper section and a lower section. The upper section is in threaded connection with the central hole, and the joint cap is in threaded connection with the lower section.

In another preferred embodiment, one end of the joint cap facing the joint main body is provided with an annular groove for allowing the chamfered edge of the end portion of the joint main body to be clamped therein.

Compared with the prior art, the present disclosure has the following advantages: first, when assembled with a cable, the sealing structure of the present disclosure allows the terminal connected to the end portion of the cable to pass through the joint while preventing the elastic pieces from being pushed out; second, through the arrangement of the arc-shaped elastic pieces, the grounding area is greatly increased, and the surge and high-voltage breakdown are avoided; third, the present disclosure achieves convenient installation and direct insertion, which is time-saving and labor-saving; the shielding layer does not need to be cut open such that a quick grounding is realized; fourth, once the cable is inserted into the joint, the shielding and sealing are completed, achieving a quick, efficient, safe and reliable installation.

DETAILED DESCRIPTION

Figure 1:
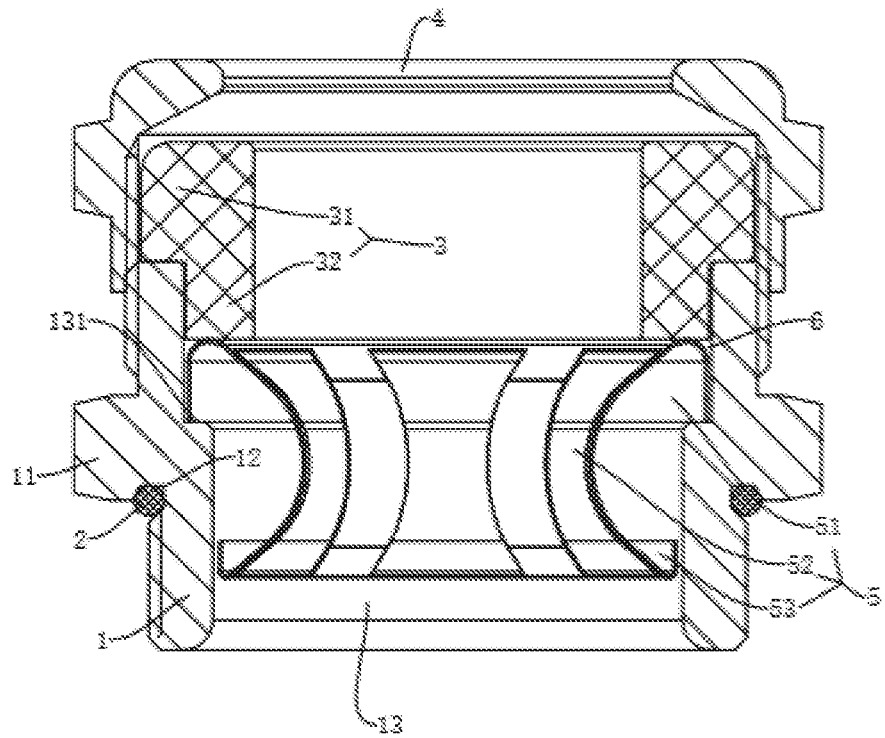
FIG. 1 is a conceptual diagram illustrating a sectional view of the electromagnetic compatibility type cable locking joint of the present disclosure.
Figure 2:
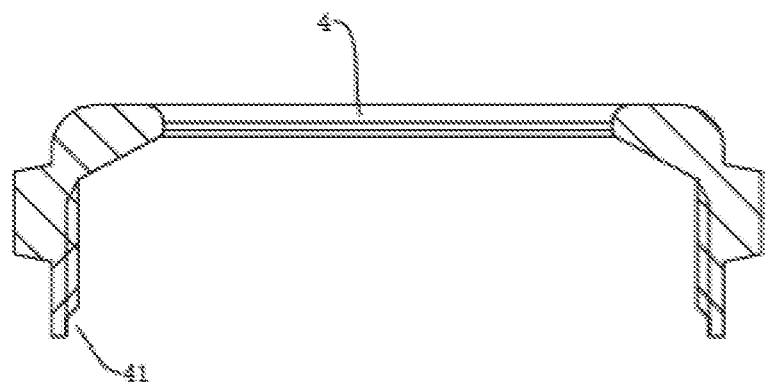
FIG. 2 is a conceptual diagram illustrating a sectional view of the joint cap of the present disclosure.

FIGS. 1-2 are combined hereinafter to further elaborate the technical solution of the present disclosure.

As shown in FIGS. 1-2, an electromagnetic compatibility type cable locking joint comprises a joint main body 1, a joint cap 4, a sealing ring 3, and a shielding member 5.

The joint main body 1 is provided with a tubular central hole 13, and an inner step 131 is arranged in the central hole. The sealing ring 3 is connected to an end portion of the joint main body 1, and a positioning groove 6 is formed between the sealing ring 3 and the inner step. Namely, the outer surface of the sealing ring 3 is configured to be step-shaped and is divided into an upper section 32 and a lower section 31. The upper section 32 is in threaded connection with the central hole, thereby forming the positioning groove 6 between the inner step and the end wall of the upper section 32. The end wall of the lower section 31 abuts against the end wall of the joint main body 1, and the joint cap 4 is in threaded connection with the lower section 31 of the sealing ring 3.

The shielding member 5 comprises an upper ring 51, a lower ring 53, and a plurality of arc-shaped elastic pieces 52. The arc-shaped elastic pieces 52 are circumferentially uniformly arranged. In this embodiment, there are six arc-shaped elastic pieces 52. The upper end of each arc-shaped elastic piece 52 is formed on the upper ring 51, and the lower end of each arc-shaped elastic piece 52 is formed on the lower ring 53. The middle portion of the arc-shaped elastic piece 52 is bent towards the center of the upper ring 51 or the lower ring 53. The shielding member 5 is arranged in the central hole, the upper ring 51 is located in the positioning groove 6, and the lower ring 53 is capable of moving along the axial direction of the central hole. As the upper ring 51 is located in the positioning groove 6, one end of the shielding member 5 is fixed, which effectively prevents the shielding member 5 from being pushed out from the joint main body 1 when the cable is inserted into the joint main body 1. In this way, the cable may be repeatedly inserted into or pulled out from the joint. Meanwhile, when the arc-shaped elastic pieces 52 are squeezed by the cable, for the lower ring 53 is capable of moving in the central hole, the arc-shaped elastic pieces 52 deform, and the lower ring 53 moves away from the upper ring 51, thereby allowing the cable to be effectively inserted into the joint and fixed by the six arc-shaped elastic pieces 52. Moreover, as the positioning groove is formed by the joint main body and the sealing ring, when the sealing ring is removed from the joint main body, the shielding member may be conveniently taken out.

Further, the upper end of the arc-shaped elastic piece 52 is formed at the upper end of the upper ring 51, and the position where the arc-shaped elastic piece 52 is formed is configured to be over-arc. Through adopting the aforesaid arrangement, the sealing ring 3 is protected against the abrasion.

Further, the lower end of the arc-shaped elastic piece 52 is formed at the lower end of the lower ring 53, and the position where the lower ring 53 is formed is configured to be over-arc. The aforesaid design allows the cable to be conveniently inserted into the joint.

Further, a flange 11 is arranged on the outer sidewall of the joint main body 1, and a mounting groove 12 is formed at the position where the sidewall of the joint main body 1 and the flange 11 are connected. The mounting groove 12 is internally provided with a sealing washer 2. By means of the aforesaid design, when the joint main body 1 and the metal shell are connected, the waterproof effect is greatly improved.

Further, one end of the joint cap 4 facing the joint main body 1 is provided with an annular groove 41 for allowing the chamfered edge of the end portion of the joint main body 1 to be clamped therein. According to this arrangement, the waterproof effect between the joint main body 1 and the joint cap 4 is significantly enhanced, which effectively prevents water from seeping into the interior of the present disclosure.

The above are merely preferred embodiments of the present disclosure, and the scope of the present disclosure is not limited to the embodiments described above. All technical solutions obtained under the idea of the present disclosure shall fall into the scope of the present disclosure. It should be noted that various improvements and modifications may be made by those skilled in the art without departing from the principles of the present disclosure. Therefore, these improvements and modifications shall also fall into the scope of the present disclosure.

What is claimed is:

1. An electromagnetic compatibility type cable locking joint, comprising:
    a joint main body,
    a joint cap,
    a sealing ring, and
    a shielding member, wherein the joint main body is provided with a tubular central hole, and an inner step is arranged in the central hole, wherein the sealing ring is connected to an end portion of the joint main body, and a positioning groove is formed between the sealing ring and the inner step, wherein the shielding member comprises an upper ring, a lower ring and a plurality of arc-shaped elastic pieces, wherein the upper ring is substantially length of the central hole and bends towards the middle of the central hole, wherein the lower ring is substantially length of the central hole and bends towards the middle of the central hole, wherein the arc-shaped elastic pieces are circumferentially uniformly arranged, wherein the upper end of each arc-shaped elastic piece is formed on the upper ring, and the lower end of each arc-shaped elastic piece is formed on the lower ring, wherein the upper ring and the lower ring are positioned underneath the arc-shaped elastic pieces, wherein the middle portion of the arc-shaped elastic piece is bent towards the center of the upper ring or the lower ring, wherein the shielding member is arranged in the central hole, the upper ring is located in the positioning groove, and the lower ring is capable of moving along the axial direction of the central hole.

2. The electromagnetic compatibility type cable locking joint of claim 1, wherein the upper end of the arc-shaped elastic piece is formed at the upper end of the upper ring, and position where the arc-shaped elastic piece is formed is configured to be over-arc.

3. The electromagnetic compatibility type cable locking joint of claim 1, wherein the lower end of the arc-shaped elastic piece is formed at the lower end of the lower ring, and position where the lower ring is formed is configured to be over-arc.

4. The electromagnetic compatibility type cable locking joint of claim 1, wherein a flange is arranged on the outer side wall of the joint main body, and a mounting groove is formed at position where a side wall of the joint main body and the flange are connected, wherein the mounting groove is internally provided with a sealing washer.

5. The electromagnetic compatibility type cable locking joint of claim 1, wherein the outer surface of the sealing ring is configured to be step-shaped and is divided into an upper section and a lower section, wherein the upper section is in threaded connection with the central hole, and the joint cap is in threaded connection with the lower section.

6. The electromagnetic compatibility type cable locking joint of claim 1, wherein one end of the joint cap facing the joint main body is provided with an annular groove for allowing chamfered edge of the end portion of the joint main body to be clamped therein.

* * * * *